United States Patent
Bandyopadhyay et al.

(10) Patent No.: US 9,210,447 B2
(45) Date of Patent: Dec. 8, 2015

(54) METHOD AND APPARATUS FOR VIDEO ERROR CONCEALMENT USING REFERENCE FRAME SELECTION RULES

(75) Inventors: Saurav Kumar Bandyopadhyay, Buffalo, NY (US); Zhenyu Wu, Plainsboro, NJ (US); Purvin Bibhas Pandit, Franklin Park, NJ (US); Jill MacDonald Boyce, Manalapan, NJ (US)

(73) Assignee: Thomson Licensing LLC, Princeton, NJ (US)

( * ) Notice: Subject to any disclaimer, the term of this patent is extended or adjusted under 35 U.S.C. 154(b) by 1316 days.

(21) Appl. No.: 12/085,257

(22) PCT Filed: Oct. 26, 2006

(86) PCT No.: PCT/US2006/041721
§ 371 (c)(1),
(2), (4) Date: May 20, 2008

(87) PCT Pub. No.: WO2007/067271
PCT Pub. Date: Jun. 14, 2007

(65) Prior Publication Data
US 2009/0238280 A1    Sep. 24, 2009

Related U.S. Application Data

(60) Provisional application No. 60/748,250, filed on Dec. 7, 2005.

(51) Int. Cl.
*H04N 7/26* (2006.01)
*H04N 19/895* (2014.01)
(Continued)

(52) U.S. Cl.
CPC ............. *H04N 19/895* (2014.11); *H04N 19/44* (2014.11); *H04N 19/51* (2014.11); *H04N 19/86* (2014.11)

(58) Field of Classification Search
CPC .................................................... H04N 19/895
USPC ....................................... 375/240.01, 240.16
IPC ........................................................ H04N 7/26
See application file for complete search history.

(56) References Cited

U.S. PATENT DOCUMENTS

| | | | |
|---|---|---|---|
| 6,480,546 B1 * | 11/2002 | Kim et al. | 375/240.27 |
| 2003/0012285 A1 | 1/2003 | Kim | |

(Continued)

FOREIGN PATENT DOCUMENTS

| | | |
|---|---|---|
| JP | 2002077922 | 3/2002 |
| JP | 2005303487 | 10/2005 |

(Continued)

OTHER PUBLICATIONS

Aramvith et al., "MPEG-1 and MPEG-2 Video Standards", Section 1.3.2 & Fig. 4, 1999 Academic Press.*

(Continued)

*Primary Examiner* — Jay Au Patel
*Assistant Examiner* — Yulin Sun
(74) *Attorney, Agent, or Firm* — Vincent E. Duffy; Guy Eriksen; Ivonete Markman

(57) ABSTRACT

There are provided methods and apparatus for block-based error concealment. An apparatus includes an error concealment module for concealing a current block in a lost picture in a group of pictures by using a last available inter-coded picture in a previous group of pictures, when the lost picture is a first inter-coded picture in the group of pictures. The group of pictures has a pattern characterized as an intra-coded picture followed by a sequence of inter-coded pictures.

22 Claims, 3 Drawing Sheets

(51) Int. Cl.
*H04N 19/51* (2014.01)
*H04N 19/44* (2014.01)
*H04N 19/86* (2014.01)

(56) References Cited

U.S. PATENT DOCUMENTS

| | | | | |
|---|---|---|---|---|
| 2003/0142748 | A1* | 7/2003 | Tourapis et al. | 375/240.13 |
| 2004/0139462 | A1* | 7/2004 | Hannuksela et al. | 725/32 |
| 2004/0228413 | A1* | 11/2004 | Hannuksela | 375/240.25 |
| 2004/0240547 | A1* | 12/2004 | Ogura et al. | 375/240.12 |
| 2005/0008240 | A1* | 1/2005 | Banerji et al. | 382/238 |
| 2005/0025053 | A1* | 2/2005 | Izzat et al. | 370/231 |
| 2005/0207497 | A1 | 9/2005 | Rovati et al. | |
| 2006/0109805 | A1* | 5/2006 | Malamal Vadakital et al. | 370/299 |
| 2006/0262864 | A1* | 11/2006 | Shi et al. | 375/240.27 |

FOREIGN PATENT DOCUMENTS

| | | |
|---|---|---|
| WO | WO02071736 | 9/2002 |
| WO | WO2004075554 | 9/2004 |
| WO | WO2006008673 | 1/2006 |

OTHER PUBLICATIONS

Richardson, "White Paper: H.264 / AVC Picture Management", Section 3.2.1-3.2.2, 2004 Vcodex Ltd.*

Aramvith et al., "MPEG-1 and MPEG-2 Video Standards", 1999 Academic Press.*

Richardson, "White Paper: H.264/ AVC Picture Management", 2004 Vcodex Ltd.*

Cheng, S. C. et. al.: "Efficient Adaptive Error Concealment Technique for Video Decoding System," IEEE Transactions on Multimedia, vol. 7, No. 5, Oct. 2005, pp. 860-868, XP011139265.

Bandyopadhyay, S. et. al.: "Frame Loss Error Concealment for H.264/AVC," [Online], Joint Video Team (JVT) of ISO/IEC MPEG & ITU-T VCEG (ISO/IEC JTC1/SC29WG11 and ITU-T SG16 Q.6) 16th Meeting: Poznan, PL, Jul. 24-29, 2005, XP002431094.

Baccichet P., et al., "A Low Complexity Concealment Algorithm for the Whole-Frame Loss in H.264/AVC", Multimedia Signal Processing, 2004 IEEE 6th Workshop on Siena, Italy, Sep. 29-Oct. 1, 2004, XP010802140.

"Advanced Video Coding for Generic Audiovisual Services; H.264 (May 2003)", May 30, 2003, International Telecommunication Union, Geneva; CH, XP017401452.

Belfiore, S. et al., "Concealment of Whole-Frame Losses for Wireless Low Bit-Rate Video Based on Multiframe Optical Flow Estimation", IEEE Transactions on Multimedia, USA IEEE Service Center, vol. 7, No. 2, Apr. 2005, pp. 316-329.

* cited by examiner

METHOD AND APPARATUS FOR VIDEO ERROR CONCEALMENT USING REFERENCE FRAME SELECTION RULES

CROSS-REFERENCE TO RELATED APPLICATIONS

This application claims the benefit, under 35 U.S.C. §365 of International Application PCT/US2006/041721 filed Oct. 26, 2006, which was published in accordance with PCT Article 21(2) on Jun. 14, 2007 in English and which claims the benefit of U.S. provisional patent application No. 60/748,250 filed Dec. 7, 2005.

FIELD OF THE INVENTION

The present invention relates generally to video decoding and, more particularly, to a method and apparatus for video error concealment using reference frame selection rules.

BACKGROUND OF THE INVENTION

In error-prone transmission environments (e.g., the Internet, wireless networks, and so forth), a transmitted video bitstream may suffer corruptions caused by channel impairment. A common situation encountered in some practical systems is that certain compressed video frames are dropped from a bitstream. It is especially true for low bit-rate applications where a frame is small enough to be coded into a transmit unit, such as a real time transport protocol (RTP) packet. At the receiver end, a robust video decoder should be able to handle the frame losses.

Moreover, when a frame is lost in a corrupted bitstream, frame-based error concealment methods can be used to conceal the lost frame. One prior art approach to frame-based error concealment requires that a reference frame that is received and decoded before a detected lost frame be used as the reference frame for the lost frame. According to the prior art approach, the existence of the previously received and decoded reference frame is always assumed. However, this practice does not necessarily produce the best concealment performance for some specific frames or bitstream patterns and, thus, may result in unnecessary degradation of concealment quality.

SUMMARY OF THE INVENTION

These and other drawbacks and disadvantages of the prior art are addressed by the present invention, which is directed to a method and apparatus for video error concealment using reference frame selection rules.

According to an aspect of the present invention, there is provided an apparatus for block-based error concealment. The apparatus includes an error concealment module for concealing a current block in a lost picture in a group of pictures by using a last available inter-coded picture in a previous group of pictures, when the lost picture is a first inter-coded picture in the group of pictures. The group of pictures has a pattern characterized as an intra-coded picture followed by a sequence of inter-coded pictures.

According to another aspect of the present invention, there is provided a method for block-based error concealment. The method includes concealing a current block in a lost picture in a group of pictures by using a last available inter-coded picture in a previous group of pictures, when the lost picture is a first inter-coded picture in the group of pictures. The group of pictures has a pattern characterized as an intra-coded picture followed by a sequence of inter-coded pictures.

According to yet another aspect of the present invention, there is provided an apparatus for block-based error concealment. The apparatus includes an error concealment module for concealing a current block in a lost picture in a group of pictures by using a temporally closest preceding picture in the group of pictures, irrespective of picture type, when the lost picture is an inter-coded reference picture. The group of pictures has a pattern characterized as an intra-coded picture followed by a sequence of inter-coded reference pictures and inter-coded non-reference pictures.

According to still another aspect of the present invention, there is provided a method for block-based error concealment. The method includes concealing a current block in a lost picture in a group of pictures by using a temporally closest preceding picture in the group of pictures, irrespective of picture type, when the lost picture is an inter-coded reference picture. The group of pictures has a pattern characterized as an intra-coded picture followed by a sequence of inter-coded reference pictures and inter-coded non-reference pictures.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
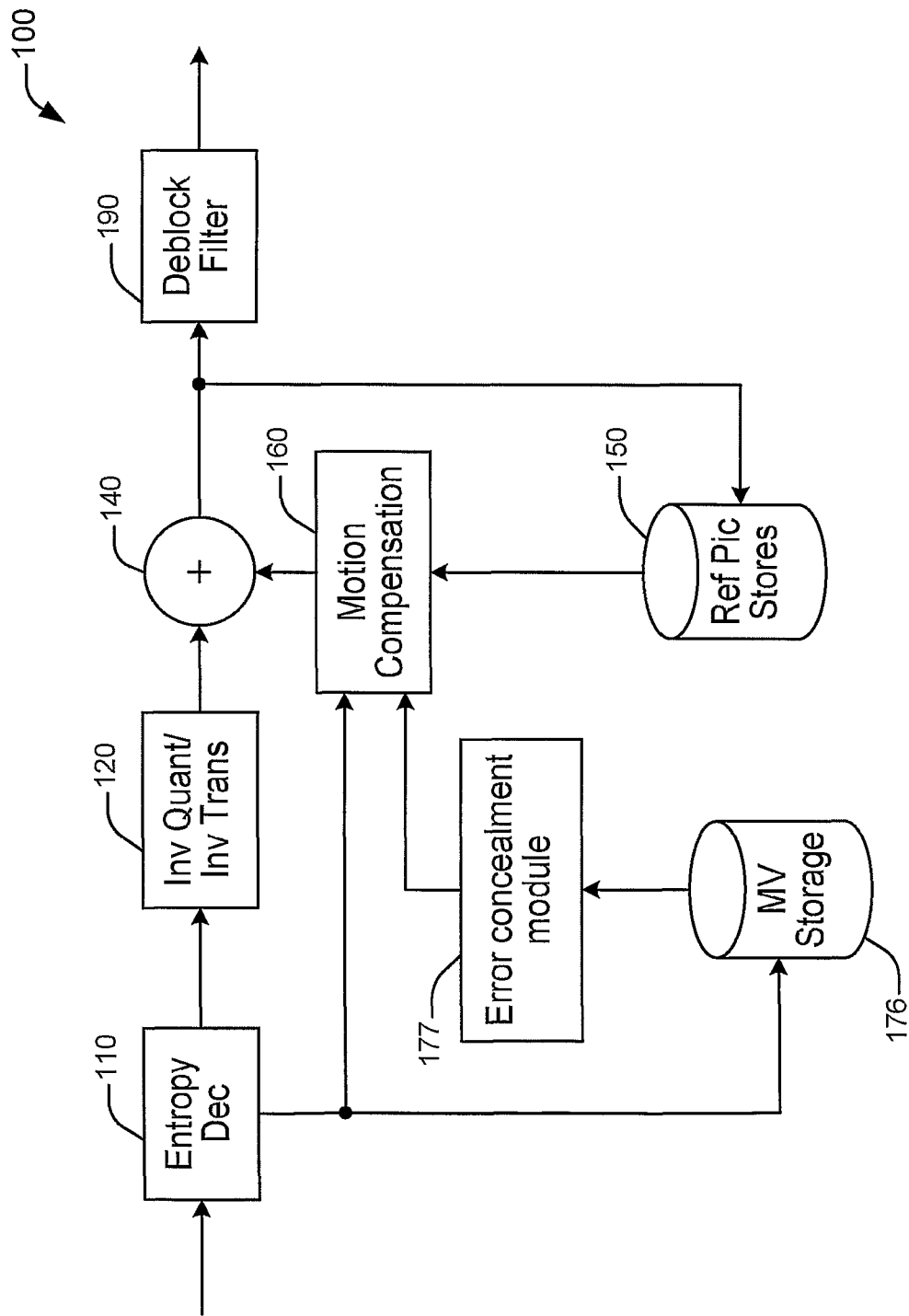
FIG. 1 is a diagram for an exemplary scalable video decoder to which the present principles may be applied.

The present invention is directed to a method and apparatus for video error concealment using reference frame selection rules.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Turning to FIG. 1, an exemplary decoder to which the present principles may be applied is indicated generally by the reference numeral 100. The video decoder 100 includes an entropy decoder 110. A first output of the entropy decoder 110 is connected in signal communication with an input of an inverse quantizer/transformer 120. An output of the inverse quantizer/transformer 120 is connected in signal communication with a first input of a summing junction 140.

The output of the summing junction 140 is connected in signal communication with a deblock filter 190. An output of the deblock filter 190 is connected in signal communication with reference picture stores 150. The reference picture store 150 is connected in signal communication with a first input of a motion compensator 160. An output of the motion compensator 160 is connected in signal communication with a second input of the summing junction 140.

A second output of the entropy decoder 110 is connected in signal communication with an input of a motion vector (MV) store 176 and a second input of the motion compensator 160. An output of the motion vector store 176 is connected in signal communication with an input of an error concealment module 177. An output of the error concealment module 177 is connected in signal communication with a third input of the motion compensator 160. The output of the deblock filter 190 provides the output of the video decoder 100.

In accordance with the present principles, a number of rules are proposed for the selection of proper frames to be referenced during error concealment for lost frames of different types. The following exemplary cases are considered: (1) in an IPPP . . . bitstream pattern, the first P frame after an I frame is lost; and (2) in an IpPpP . . . bitstream pattern, a P frame is lost. Of course, it is to be appreciated that the present principles are not limited to solely the preceding bitstream patterns and, thus, other bitstream patterns may also be utilized in accordance with the present principles. That is, given the teachings of the present principles provided herein, one of ordinary skill in this and related arts will contemplate these and various other bitstream patterns to which the present principles may be advantageously applied, while maintaining the scope of the present principles. Moreover, it is to be appreciated that while examples of the present principles are described herein with respect to frames, the present principles are equally applicable to pictures, fields, and so forth.

In the above-described prior art approach, the Joint Model (JM) decoder software corresponding to the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 standard (hereinafter the "MPEG4/H.264 standard" or simply the "H.264 standard") is equipped with the functionalities to detect and conceal a lost frame. The following two options are available for frame loss error concealment in the JM decoder software: (a) frame copy; and (b) motion copy. However, both options require a specific received and decoded frame to be referenced during error concealment. In the above-described prior art approach, the previously available reference frame before a lost frame is selected. However, for some specific bitstream patterns or loss cases, this is not always the best practice.

Consider a GOP (group of pictures) with an IPPP . . . bitstream pattern. Suppose the first P frame in the GOP is lost. In accordance with the above-referenced prior art approach, if "motion copy" error concealment is invoked to conceal the P frame, the I-frame is selected as its reference frame. Since the I-frame does not carry motion information (motion vectors are equal to 0), "motion copy" is equivalent to "frame repeat" in this case, which can cause significant concealment distortion and error propagation, especially for high-motion video sequences. An I-frame is often inserted at a scene change, and in this case the above practice generally produces the best possible result. However, an I-frame can also be inserted for other purposes such as error resilience and random access, where an I-frame does not necessarily correspond to a dramatic change in the scene. For the latter case, we propose to use the last available P frame from the previous GOP as the reference frame for the concealment. Since the P frame carries motion information, "motion copy" can be invoked normally to conceal the lost P frame in the current GOP. Compared to using the I-frame as the reference frame, despite the larger temporal distance between the two P frames, performance improvement can still be achieved for those high-motion video sequences by utilizing the motion information.

Consider a GOP with an IpPpP . . . bitstream pattern, where "p" denotes a non-reference P frame and "P" denotes a reference P frame. Suppose that a P frame is lost. According to the above-described prior art approach, its previous available reference frame is used for error concealment. In contrast, in accordance with an embodiment of the present principles, we propose to use its immediately preceding p frame, if available, for error concealment. Compared to the method in the above-described prior art approach, the proposed rule uses a frame that is temporally closer to the lost frame. Therefore, the new reference frame generally has more correlation to the lost frame, both for pixel values and motion information. Hence, "frame repeat" as well as "motion copy" error concealment methods can benefit from the proposed rule. Since a p-frame is not stored in the decoder buffer, its motion information is, thus, not available in the decoder buffer. Therefore, for "motion copy" error concealment, in order to realize the proposed rule, the p-frame in a (P,p) pair has to be stored for the possible loss of the next P-frame. After each time a p-frame is decoded, only this p-frame needs to be stored and it replaces the existing p-frame in the memory.

Specifically, the decoded pixel values of the p-frame and its motion information (motion vectors, reference indices) have to be stored in a buffer allocated for that use. This additional functionality is easy to implement and does not add much complexity to the decoder.

Figure 2A:
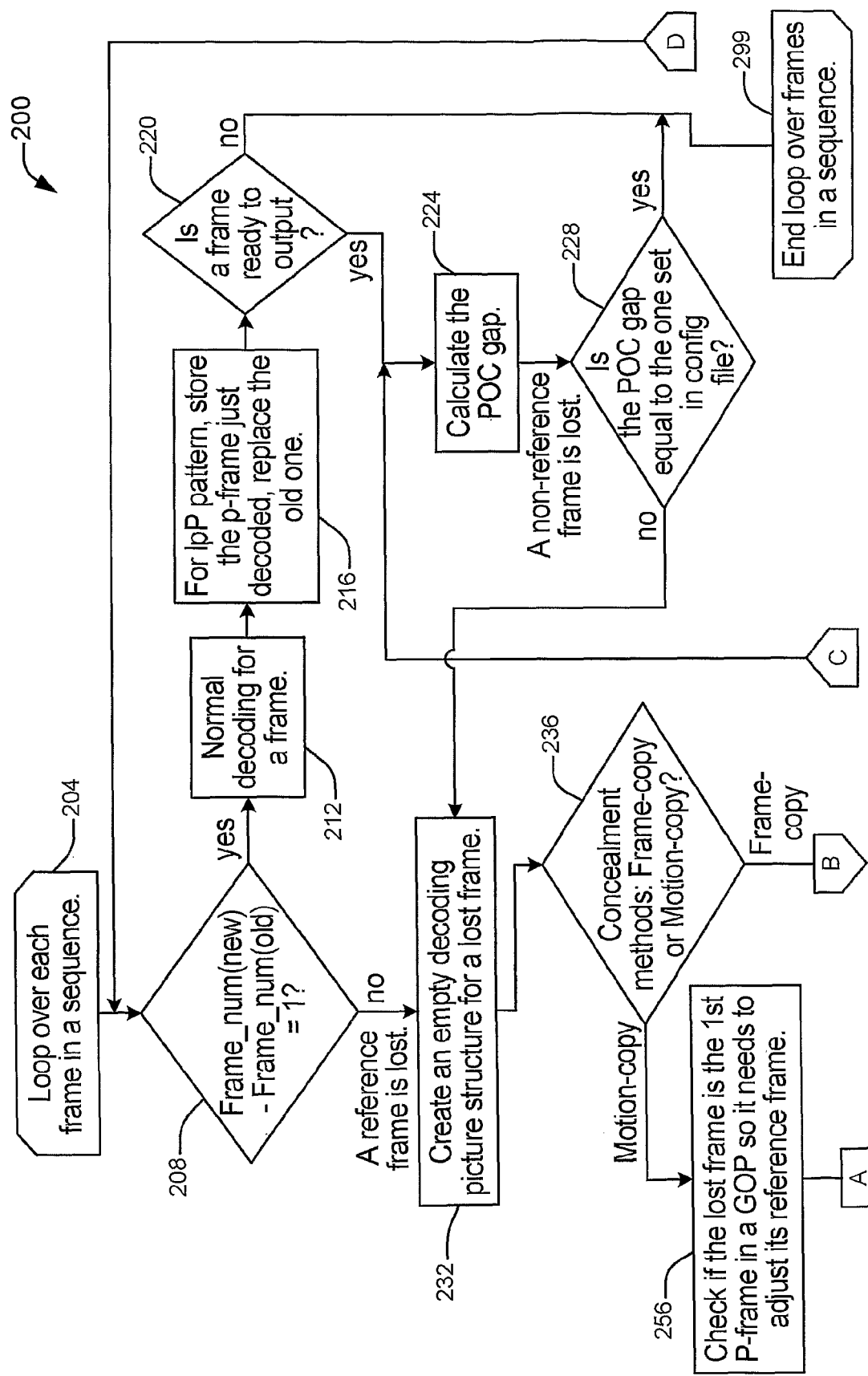
FIG. 2 is a diagram for an exemplary method for frame-based error concealment in a video decoder according to an embodiment of the present principles.
Figure 2B:
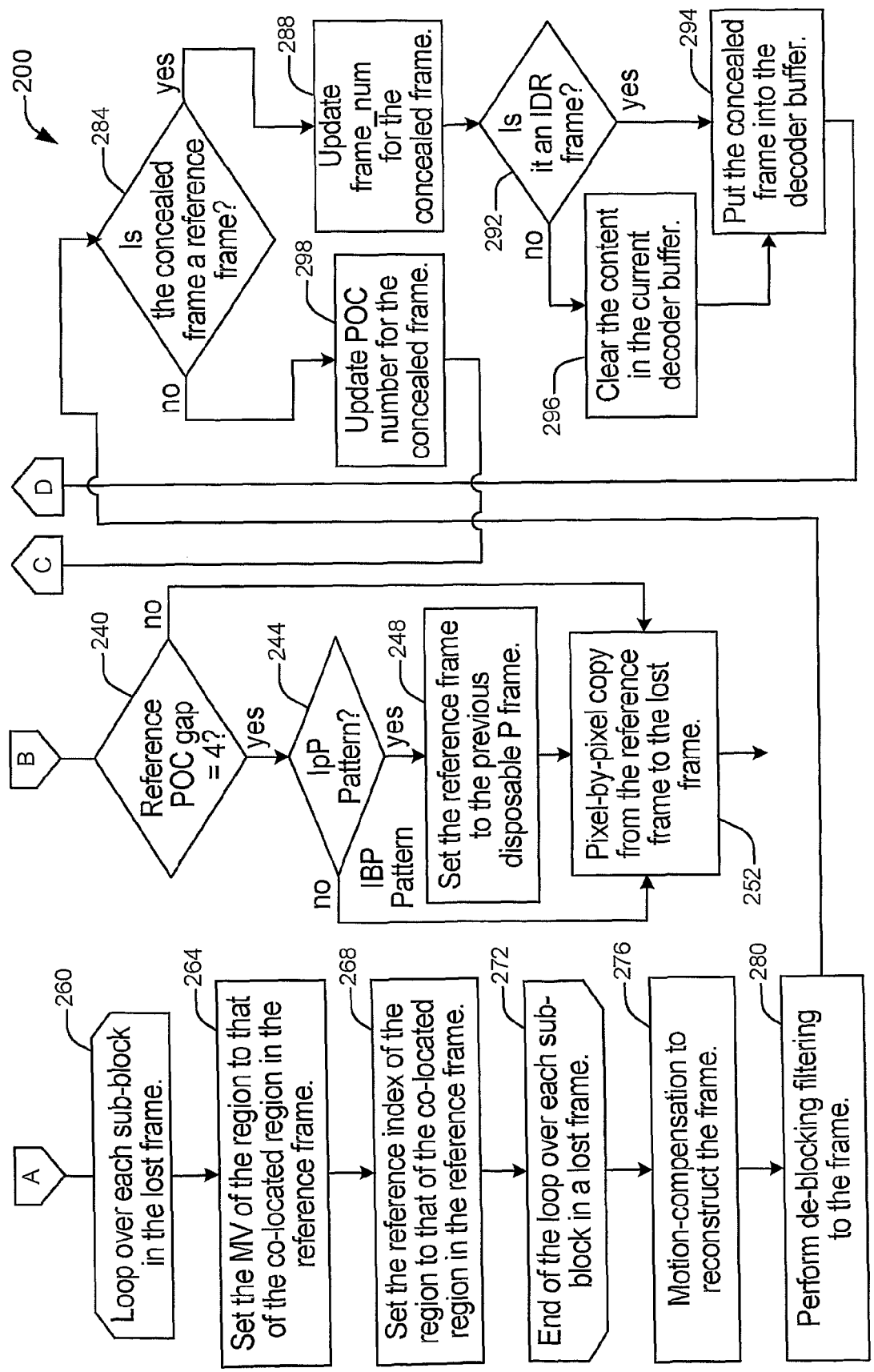

Turning to FIG. 2, an exemplary method for frame-based error concealment in a video decoder is indicated generally by the reference numeral 200.

A loop limit block 204 loops over each frame in a sequence, and passes control to a decision block 208. The decision block 208 determines whether or not frame_num(new)−frame_num(old)=1. If so, then control is passed to a function block 212. Otherwise, control is passed to a function block 232.

The function block 212 performs normal decoding for a frame, and passes control to a function block 216. The function block 216, for an IpP . . . pattern, stores the p frame just decoded so as to replace a previously decoded p frame, and passes control to a decision block 220. The decision block 220 determines whether or not a frame is ready to output. If so, then control is passed to a function block 224. Otherwise, control is passed to a loop limit block 299.

The function block 224 calculates the picture order count (POC) gap, and passes control to a decision block 228. The decision block 228 determines whether or not the POC gap calculated by function block 224 is equal to a POC gap set in a configuration file. If so, then control is passed to the loop limit block 299. Otherwise, control is passed to a function block 232.

The loop limit block 299 ends the loop over the frames in the sequence.

The function block 232 creates an empty decoding picture structure for a lost frame, and passes control to a decision block 236. The decision block 236 determines whether or not frame-copy or motion-copy is to be used. If motion copy is to be used, then control is passed to a function block 256. Otherwise, if frame-copy is to be used, then control is passed to a decision block 240.

The function block 256 checks if the lost frame is the first P-frame in a GOP (so that an adjustment is to be performed for the reference frame of the lost frame), and passes control to a loop limit block 260. The loop limit block 260 loops over each sub-block in the lost frame, and passes control to a function block 264. The function block 264 sets the motion vector of a region in a sub-block in the lost frame to that of the co-located region in the reference frame, and passes control to a function block 268. The function block 268 sets the reference index of the region to that of the co-located region in the reference frame, and passes control to a loop limit block 272. The loop limit block 272 ends the loop over each sub-block in the lost frame, and passes control to a function block 276. The function block 276 performs motion compensation to reconstruct the frame, and passes control to a function block 280. The function block 280 applies de-blocking filtering to the frame, and passes control to a decision block 284. The decision block 284 determines whether or not the concealed frame is a reference frame. If so, then control is passed to a function block 288. Otherwise, control is passed to a function block 298.

The function block 288 updates frame_num for the concealed frame, and passes control to a decision block 292. The decision block 292 determines whether or not the current frame is an instantaneous decoding refresh (IDR) frame. If so, then control is passed to a function block 294. Otherwise, control is passed to a function block 296.

The function block 294 puts the concealed frame into the decoder buffer, and returns control to the decision block 208.

The function block 296 clears the content in the current decoder buffer, and passes control to the function block 294.

The decision block 240 determines whether or not the reference gap POC is equal to four. If so, then control is passed to a decision block 244. Otherwise, control is passed to a function block 252.

The decision block 244 determines whether or not the current frame includes an IpP . . . pattern. If so, then control is passed to a function block 248. Otherwise, control is passed to the function block 252.

The function block 248 sets the reference frame to the previous disposable P frame, and passes control to a function block 252.

The function block 252 performs a pixel-by-pixel copy from the reference frame to the lost frame, and passes control to the loop limit block 299.

Thus, in accordance with one exemplary embodiment of the present principles, for a GOP with a bitstream pattern characterized as an intra-coded frame followed by a sequence of inter-coded frames (e.g., an IPPPP . . . sequence), when the first inter-coded frame is lost and the intra-coded frame does not correspond to a scene change, the last available predictive frame from the previous GOP is used for error concealment.

Moreover, in accordance with another exemplary embodiment of the present principles, for a GOP with a bitstream pattern characterized as an intra-coded frame followed by a sequence of inter-coded frames which are either of a non-reference type (p) or a reference type (P) (e.g., an IpPpP . . . sequence), when a reference type inter-coded frame is lost (except for the preceding case described with respect to the IPPPP . . . sequence), its temporally closest preceding frame(s) (regardless of the frame type) is used for error concealment.

As noted above, it is to be appreciated that while the present principles are primarily described herein with respect to frames, the present principles are equally applicable to pictures, fields, and so forth, as is readily ascertained by one of ordinary skill in this and related arts. Moreover, it is to be appreciated that the present principles are not limited to solely the preceding bitstream patterns and, thus, other bitstream patterns may also be utilized in accordance with the present principles. That is, given the teachings of the present principles provided herein, one of ordinary skill in this and related arts will contemplate these and various other bitstream patterns to which the present principles may be advantageously applied, while maintaining the scope of the present principles.

A description will now be given of some of the many attendant advantages/features of the present invention, some of which have been mentioned above. For example, one advantage/feature is an apparatus for block-based error concealment that includes an error concealment module for concealing a current block in a lost picture in a group of pictures by using a last available inter-coded picture in a previous group of pictures, when the lost picture is a first inter-coded picture in the group of pictures. The group of pictures has a pattern characterized as an intra-coded picture followed by a sequence of inter-coded pictures.

Another advantage/feature is the apparatus as described above, wherein the error concealment module conceals the current block by deriving motion information for the current block from a co-located block in the last available predictive picture.

Yet another advantage/feature is the apparatus having the error concealment module that derives the motion information for the current block from a co-located block as described above, wherein the error concealment module derives a reference index for use for the current block from a reference index of the co-located block.

Moreover, another advantage/feature is the apparatus as described above, wherein the intra-coded picture in the group of pictures is without correspondence to a scene change.

Further, another advantage/feature is the apparatus as described above, wherein the error concealment module performs a pixel-by-pixel copy from a co-located pixel in the last available predictive picture to a current pixel in the lost picture, when a picture order count gap from the lost picture in the group of pictures to the last available predictive picture in the previous group of pictures is greater than a threshold.

Also, another advantage/feature is the apparatus as described above, wherein the error concealment module updates a picture order count of the lost picture.

Additionally, another advantage/feature is an apparatus for block-based error concealment that includes an error concealment module for concealing a current block in a lost picture in a group of pictures by using a temporally closest preceding picture in the group of pictures, irrespective of picture type, when the lost picture is an inter-coded reference picture. The group of pictures has a pattern characterized as an intra-coded picture followed by a sequence of inter-coded reference pictures and inter-coded non-reference pictures.

Another advantage/feature is the apparatus having the error concealment module that conceals the current block using the temporally closest preceding picture as described above, wherein the error concealment module conceals the current block by deriving motion information for the current block from a co-located block in the temporally closest preceding picture.

Yet another advantage/feature is the apparatus having the error concealment module that conceals the current block using the temporally closest preceding picture and that derives the motion information for the current block from the co-located block as described above, wherein the error concealment module derives a reference index for use for the current block from a reference index of the co-located block.

Moreover, another advantage/feature is the apparatus having the error concealment module that conceals the current block using the temporally closest preceding picture as described above, wherein the intra-coded picture in the group of pictures is without correspondence to a scene change.

Further, another advantage/feature is the apparatus having the error concealment module that conceals the current block using the temporally closest preceding picture as described above, wherein the error concealment module performs a pixel-by-pixel copy from a co-located pixel in the temporally closest preceding picture to a current pixel in the lost picture, when a picture order count gap from the lost picture to the temporally closest preceding picture is greater than a threshold.

Also, another advantage/feature is the apparatus having the error concealment module that conceals the current block using the temporally closest preceding picture as described above, wherein the error concealment module updates a picture number of the lost picture.

Also, another advantage/feature is the apparatus having the error concealment module that conceals the current block using the temporally closest preceding picture as described above, wherein the apparatus further includes a buffer for storing the lost picture subsequent to concealment, when the lost picture is an instantaneous decoding refresh picture.

Additionally, another advantage/feature is the apparatus having the error concealment module that conceals the current block using the temporally closest preceding picture as described above, wherein the lost picture is stored so as to replace a previously concealed lost picture.

Moreover, another advantage/feature is the apparatus having the error concealment module that conceals the current block using the temporally closest preceding picture as described above, wherein the apparatus further includes a buffer for storing the last available non-reference inter-coded picture for use in concealing the current block in the lost picture, subsequent to decoding of the last available non-reference inter-coded picture.

Further, another advantage/feature is the apparatus having the error concealment module that conceals the current block using the temporally closest preceding picture as described above, wherein the apparatus further includes a buffer for storing motion vectors for the last available non-reference inter-coded picture for use in concealing the current block in the lost picture, subsequent to decoding of the last available non-reference inter-coded picture.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. An apparatus for block-based error concealment, comprising: an error concealment module conceals a current block in a lost picture in a group of pictures by using only a temporally closest inter-coded forward-predicted non-reference p preceding picture in the group of pictures, when the lost picture is an inter-coded forward predicted reference picture P, the group of pictures having a pattern characterized as IpPpPpPpP . . . , an intra-coded picture I followed by a sequence of alternating inter-coded forward-predicted non-reference pictures p and inter-coded forward-predicted reference pictures P; and a module provides the concealed current block as an output.

2. The apparatus of claim 1, wherein said error concealment module conceals the current block by deriving motion information for the current block from a co-located block in the temporally closest preceding picture.

3. The apparatus of claim 2, wherein said error concealment module derives a reference index for use for the current block from a reference index of the co-located block.

4. The apparatus of claim 1, wherein the intra-coded picture in the group of pictures is without correspondence to a scene change.

5. The apparatus of claim 1, wherein said error concealment module performs a pixel-by-pixel copy from a co-located pixel in the temporally closest preceding picture to a current pixel in the lost picture, when a picture order count gap from the lost picture to the temporally closest preceding picture is greater than a threshold.

6. The apparatus of claim 1, wherein said error concealment module updates a picture number of the lost picture.

7. The apparatus of claim 1, further comprising a buffer for storing the lost picture subsequent to concealment, when the lost picture is an instantaneous decoding refresh picture.

8. The apparatus of claim 1, wherein the lost picture is stored so as to replace a previously concealed lost picture.

9. The apparatus of claim 1, further comprising a buffer for storing the last available non-reference inter-coded picture for use in concealing the current block in the lost picture, subsequent to decoding of the last available non-reference inter-coded picture.

10. The apparatus of claim 1, further comprising a buffer for storing motion vectors for the last available non-reference inter-coded picture for use in concealing the current block in the lost picture, subsequent to decoding of the last available non-reference inter-coded picture.

11. The apparatus of claim 1, wherein the sequence commences with one of the inter-coded non-reference pictures, and the inter-coded non-reference pictures and the inter-coded reference pictures alternate with each successive picture in the sequence.

12. A method for block-based error concealment, performed by an apparatus, comprising: concealing a current block in a lost picture in a group of pictures by using only a temporally closest inter-coded forward-predicted non-reference p preceding picture in the group of pictures, when the lost picture is an inter-coded forward-predicted reference picture P, the group of pictures having a pattern characterized as IpPpPpPpP . . . , an intra-coded picture I followed by a sequence of alternating inter-coded forward-predicted non-reference pictures p and inter-coded forward-predicted reference pictures P; and providing the concealed current block as an output.

13. The method of claim 12, wherein said concealing comprises deriving motion information for the current block from a co-located block in the temporally closest preceding picture.

14. The method of claim 13, wherein said concealing comprises deriving a reference index for use for the current block from a reference index of the co-located block.

15. The method of claim 12, wherein the intra-coded picture in the group of pictures is without correspondence to a scene change.

16. The method of claim 12, wherein said concealing comprises performing a pixel-by-pixel copy from a co-located pixel in the temporally closest preceding picture to a current pixel in the lost picture, when a picture order count gap from the lost picture to the temporally closest preceding picture is greater than a threshold.

17. The method of claim 12, wherein said concealing comprises updating a picture number of the lost picture.

18. The method of claim 12, further comprising storing the lost picture in a buffer subsequent to concealment, when the lost picture is an instantaneous decoding refresh picture.

19. The method of claim 12, wherein the lost picture is stored so as to replace a previously concealed lost picture.

20. The method of claim 12, further comprising storing the last available non-reference inter-coded picture for use in concealing the current block in the lost picture, subsequent to decoding of the last available non-reference inter-coded picture.

21. The method of claim 12, further comprising storing motion vectors for the last available non-reference inter-coded picture for use in concealing the current block in the lost picture, subsequent to decoding of the last available non-reference inter-coded picture.

22. The method of claim 12, wherein the sequence commences with one of the inter-coded non-reference pictures, and the inter-coded non-reference pictures and the inter-coded reference pictures alternate with each successive picture in the sequence.

* * * * *